United States Patent
Kondo et al.

(10) Patent No.: US 8,453,782 B2
(45) Date of Patent: Jun. 4, 2013

(54) ELECTRIC VEHICLE HAVING DRIVETRAIN AND SUSPENSION

(75) Inventors: Nobuyuki Kondo, Wako (JP); Junichi Matsuda, Wako (JP); Takasumi Yamanaka, Wako (JP); Naoyoshi Honda, Wako (JP); Izumi Kanazawa, Wako (JP); Yuichiro Shimura, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 69 days.

(21) Appl. No.: 13/282,770

(22) Filed: Oct. 27, 2011

(65) Prior Publication Data

US 2012/0103706 A1    May 3, 2012

(30) Foreign Application Priority Data

Oct. 29, 2010   (JP) ................. 2010-244335

(51) Int. Cl.
*B60K 6/42*   (2007.10)

(52) U.S. Cl.
USPC .......................................... 180/291; 180/226

(58) Field of Classification Search
USPC ................. 180/65.1, 65.31, 65.6, 291, 220, 180/226
See application file for complete search history.

(56) References Cited

U.S. PATENT DOCUMENTS

| | | | | |
|---|---|---|---|---|
| 3,904,883 A * | 9/1975 | Horwinski | ....................... | 290/50 |
| 4,233,858 A * | 11/1980 | Rowlett | ............................ | 475/5 |
| 4,436,173 A * | 3/1984 | Takahashi | ..................... | 180/226 |
| 4,664,215 A * | 5/1987 | Suzuki et al. | ................. | 180/226 |
| 5,263,549 A * | 11/1993 | Dick | .............................. | 180/226 |
| 6,615,946 B2 * | 9/2003 | Pasquini et al. | ............... | 180/248 |
| 7,506,708 B2 * | 3/2009 | Iwashita | ....................... | 180/65.1 |
| 7,510,040 B2 * | 3/2009 | Takayanagi et al. | .......... | 180/226 |
| 7,584,814 B2 * | 9/2009 | Nakanishi | ..................... | 180/227 |
| 7,644,797 B2 * | 1/2010 | Kofuji | ............................ | 180/227 |
| 7,665,562 B2 * | 2/2010 | Utsumi et al. | ................. | 180/226 |
| 7,810,603 B2 * | 10/2010 | Kofuji et al. | ................... | 180/358 |
| 7,878,290 B2 * | 2/2011 | Tsujii et al. | ................... | 180/385 |
| 7,913,793 B2 * | 3/2011 | Kofuji | ........................... | 180/226 |
| 7,946,374 B2 * | 5/2011 | Kofuji | ........................... | 180/226 |
| 7,971,674 B2 * | 7/2011 | Nimura et al. | ................ | 180/226 |
| 8,002,068 B2 * | 8/2011 | Nimura et al. | ................ | 180/226 |
| 8,297,398 B2 * | 10/2012 | Nimura et al. | ................ | 180/226 |
| 8,376,079 B2 * | 2/2013 | Ito | ................................. | 180/226 |
| 2007/0095591 A1 * | 5/2007 | Takayanagi et al. | .......... | 180/226 |
| 2007/0199756 A1 * | 8/2007 | Kofuji | ........................... | 180/226 |
| 2008/0006464 A1 * | 1/2008 | Utsumi et al. | ................ | 180/226 |

(Continued)

FOREIGN PATENT DOCUMENTS

JP    11-079054 A    3/1999

*Primary Examiner* — John R Olszewski
*Assistant Examiner* — Brodie Follman

(57) ABSTRACT

An electric vehicle includes a vehicle body frame; an electric motor; a swing arm pivotally supporting a rear wheel at a rear end thereof; a drive shaft for transmitting the driving force of the electric motor to the wheel; and a suspension connecting the vehicle body frame and the swing arm together. The electric motor is set in a longitudinal layout in which a rotating drive shaft is disposed in a front-rear direction of the vehicle; and is offset from a center to either of left and right sides in a vehicle width direction. The suspension is disposed under the electric motor and the drive shaft, and on the inner sides of the electric motor and the drive shaft in the vehicle width direction, and overlapping the positions of the electric motor and the drive shaft in the front-rear direction.

20 Claims, 5 Drawing Sheets

U.S. PATENT DOCUMENTS

| | | | |
|---|---|---|---|
| 2008/0066986 A1* | 3/2008 | Ito et al. | 180/226 |
| 2008/0156564 A1* | 7/2008 | Driessen | 180/220 |
| 2008/0156571 A1* | 7/2008 | Kofuji et al. | 180/348 |
| 2009/0057046 A1* | 3/2009 | Kofuji | 180/226 |
| 2009/0233723 A1* | 9/2009 | Kofuji | 464/158 |
| 2010/0078250 A1* | 4/2010 | Nimura et al. | 180/226 |
| 2011/0108346 A1* | 5/2011 | Nimura et al. | 180/226 |
| 2012/0080254 A1* | 4/2012 | Tsukamoto et al. | 180/68.5 |
| 2012/0103716 A1* | 5/2012 | Fujihara et al. | 180/220 |
| 2012/0111651 A1* | 5/2012 | Irie et al. | 180/65.1 |
| 2012/0318601 A1* | 12/2012 | Kuroki | 180/220 |
| 2012/0325571 A1* | 12/2012 | Nomura et al. | 180/220 |

* cited by examiner

ELECTRIC VEHICLE HAVING DRIVETRAIN AND SUSPENSION

CROSS-REFERENCE TO RELATED APPLICATION

This application claims priority of Japanese Patent Application No. 2010-244335, filed Oct. 29, 2010, the entire contents of which are incorporated herein by reference.

BACKGROUND OF THE INVENTION

The present invention relates to an electric vehicle.

Among vehicles having an electric motor for generating a travel driving force, some vehicles include a structure in which: a swing arm supporting a rear wheel is configured by a power unit including the electric motor; and a rear wheel suspension is disposed between the swing arm and a vehicle body frame above the swing arm as shown by Japanese Patent Application Publication No. Hei 11-79054.

The structure in which the rear wheel suspension is disposed between the swing arm and the vehicle body frame above the swing arm as described above has a problem in that a space above the swing arm cannot be used effectively.

A feature of the disclosed electric vehicle is to provide an effective use of the space above the swing arm.

The electric vehicle disclosed herein includes: a vehicle body frame (for example, a vehicle body frame 11 in the embodiments); an electric motor (for example, an electric motor (or motors) 41 in the embodiments) for generating a travel driving force; a swing arm (for example, a swing arm 34 in the embodiments) swingably provided in the rear of the vehicle body frame, pivotally supporting a rear wheel (for example, a rear wheel 35 in the embodiments) at a rear end of the swing arm; a drive shaft (for example, a drive shaft 52 in the embodiments) for transmitting the driving force of the electric motor to the wheel; and a suspension (for example, a suspension 67 in the embodiments) connecting the vehicle body frame and the swing arm together, wherein: the electric motor is connected to the drive shaft in a way that the electric motor is set in a longitudinal layout in which a rotating shaft (for example, a rotating shaft 42 in the embodiments) is disposed in a front-rear direction of the vehicle, and in a way that the electric motor is disposed, deviated from the center to any one of left and right sides in the vehicle width direction; and the suspension is disposed under the electric motor and the drive shaft, and on the inner sides of the electric motor and the drive shaft in the vehicle width direction, with the position of the suspension in the front-rear direction overlapping the positions of the electric motor and the drive shaft in the front-rear direction.

Additionally, the electric vehicle includes a set of the electric motor and the drive shaft disposed in each of the left and right sides in the vehicle width direction in parallel; and the suspension is disposed between the sets.

Further, the vehicle body frame includes: a head pipe (for example, a head pipe 12 in the embodiments) for pivotally supporting a steering shaft (for example, a steering shaft 14 in the embodiments); a main frame (for example, upper frames 20 in the embodiments) extending rearward from the head pipe; a seat rail (for example, seat rails 23 in the embodiments) extending rearward from the main frame; and a rear sub-frame (for example, rear sub-frames 24 in the embodiments) connecting the main frame and the seat rail together, as well as a storage box (for example, a storage box 95 in the embodiments) is attached to the seat rail by disposing the storage box in a space portion on a lateral side of the seat rail above the swing aim or the drive shaft, or in a space portion between the swing arm or the drive shaft and the seat rail.

Further, as noted the vehicle body frame includes: a head pipe (for example, a head pipe 12 in the embodiments) pivotally supporting a steering shaft (for example, a steering shaft 14 in the embodiments); upper frames (for example, upper frames 20 in the embodiments) extending rearward from the head pipe on an upper side; and lower frames (for example, lower frames 21 in the embodiments) extending rearward from the head pipe on a lower side, and further includes a battery (for example, a battery 80 in the embodiments) for supplying power to the electric motor is detachably disposed in a battery storage unit (for example, a battery storage unit 70 in the embodiments) between the upper frames and the lower frames, and the electric motor is disposed in the rear of the battery storage unit.

The electric vehicle may also include the electric motor which is attached to the vehicle body frame; and the drive shaft is connected to the electric motor by use of a constant-velocity joint (for example, a constant-velocity joint 53 in the embodiments).

The electric vehicle described above may also include the electric motor which swings integrally with the swing arm.

Additionally, the drive shaft transmits the driving force of the electric motor to the rear wheel.

The vehicle body frame, as noted, includes: a head pipe (for example, a head pipe 12 in the embodiments) pivotally supporting a steering shaft (for example, a steering shaft 14 in the embodiments); upper frames (for example, upper frames 20 in the embodiments) extending rearward from the head pipe on an upper side; and lower frames (for example, lower frames 21 in the embodiments) extending rearward from the head pipe on a lower side, and further wherein the position of the lower end of the electric motor is located above the positions of the lower ends of the lower frames, respectively.

The electric vehicle described herein makes it no longer necessary to dispose the suspension in the space above the swing arm, and accordingly makes it possible to use the space above the swing arm effectively, because: the electric motor is connected to the drive shaft in a way that the electric motor is set in the longitudinal layout in which the rotating shaft is disposed in the front-rear direction of the vehicle, and in a way that the electric motor is disposed, deviated from the center to one of the left and right sides in the vehicle width direction; and the suspension is disposed under the electric motor and the drive shaft, and on the inner sides of the electric motor and the drive shaft in the vehicle width direction, with the position of the suspension in the front-rear direction overlapping the positions of the electric motor and the drive shaft in the front-rear direction. Moreover, it is possible to dispose the electric motor, the drive shaft and the suspension compactly in a collective manner in the front-rear direction and the vehicle width direction. In addition, since the electric motor is set in the longitudinal layout in which the rotating shaft is disposed in the front-rear direction of the vehicle, it is no longer necessary to employ a mechanism for converting the direction of the axis of rotation to the front-rear direction of the vehicle, and further reduction in size can be achieved. Additionally, since the suspension is disposed under the electric motor and the drive shaft, the suspension can protect the electric motor and the drive shaft from flying stones and something similar.

Additionally, the electric vehicle described herein makes it possible to achieve equalization of the weight balance by distributing the electric motors and the drive shafts, which are heavy articles, between the left and right sides, as well as by disposing the suspension therebetween, because: the sets of the electric motors and the drive shafts are disposed, respectively, on the left and right sides in the vehicle width direction in parallel; and the suspension is disposed between the sets. Moreover, it makes it possible to reduce the arrangement space in size, and thus to secure a wider space around the arrangement space, because the distribution of the electric motors and the drive shafts between the multiple sets enables reduction in size of the electric motor and the drive shaft which are included in each set.

Additionally, the electric vehicle described above makes it possible to secure a volume for the storage box, because the storage box is attached to the seat rail by disposing the storage box in the space portion on the lateral side of the seat rail above the swing arm or the drive shaft, or in the space portion between the swing arm or the drive shaft and the seat rail.

Further, it is possible to achieve reduction in the size of the vehicle body because the battery storage box is disposed by effectively using the space (straddle portion of the rider) among the upper frames and the lower frames. In addition, it is possible to secure the height for the battery storage box by disposing the electric motor in the rear of the battery storage box.

Still further it is possible to reduce the weight of the swingable article, because: the electric motor is attached to the vehicle body frame; and the drive shaft is connected to the electric motor by use of the constant-velocity joint.

Still further it is possible to build the electric motor and the swing arm in a single unit, and thereby to improve the assembly workability, because the electric motor swings together with the swing arm integrally.

Still further it is possible to use the space in front of the electric motor effectively, because the drive shaft is that configured to transmit the driving force of the electric motor to the rear wheel.

Still further it is possible for the lower frames to prevent the bottom of the electric motor from hitting the road, because the position of the lower end of the electric motor is located above the location of the lower end of each lower frame.

BRIEF DESCRIPTION OF THE DRAWINGS

The advantages of the invention will become apparent in the following description taken in conjunction with the drawings, wherein.

DETAILED DESCRIPTION OF THE INVENTION

A first embodiment of an electric vehicle is illustrated in FIG. 1 to FIG. 4.

Figure 1:
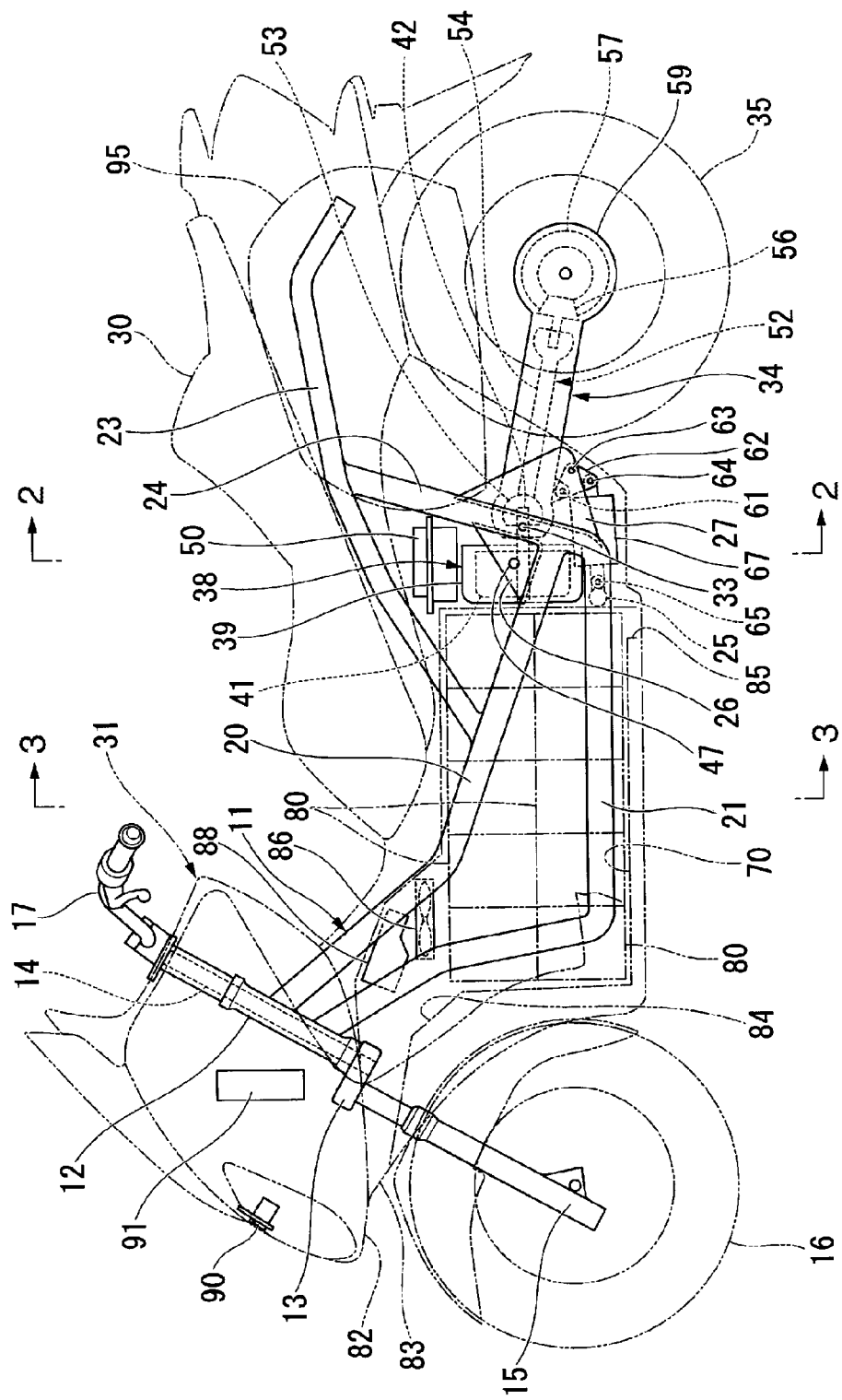
FIG. 1 is a side view showing a first embodiment of an electric vehicle.

The first embodiment of the electric vehicle is an electric motorcycle, and includes a vehicle body frame 11 forming the framework of the vehicle body as shown in FIG. 1. A steering shaft 14 provided to a stem 13 is rotatably pivotally supported by a head pipe 12 at the front end of the vehicle body frame 11. In addition, paired left and right front forks 15 are attached to the stem 13. A front wheel 16 is pivotally supported by the lower end portions of the respective front forks 15, and a handlebar 17 is attached to an upper portion on the stem 13. With this configuration, the front wheel 16 is steerable through manipulation of the handlebar 17.

In addition, the vehicle body frame 11 includes: paired left and right upper frames (main frames) 20 extending rearward, respectively, from the left and right of the upper portion of the aforementioned head pipe 12 on an upper side; and paired left and right lower frames 21 extending rearward, respectively, from the left and right of the lower portion of the head pipe 12 on a lower side. The vehicle body frame 11 is of double cradle type in which the rear ends of the upper frames 20 and the rear ends of the lower frames 21 are connected to each other in their left and right positions, respectively.

The vehicle body frame 11 further includes: paired left and right seat rails 23 extending rearward in the rear upward direction as a whole from the middle positions of the left and right upper frames 20, respectively; paired left and right rear sub-frames 24 extending in the rear upward direction respectively from the rear end portions of the left and right upper frames 20, and connecting together the left and right upper frames 20 and the left and right seat rails 23, respectively; a lower cross pipe 25 extending in the vehicle width direction, and connecting the left and right lower frames 21 together; paired left and right support plates 26 connecting together the left and right upper frames 20 and the left and right sub-frames 24, respectively; and paired left and right support plates 27 extending rearward from the lower portions of the left and right sub-frames 24, respectively.

A seat 30 is attached to the left and right seat rails 23. Note that, this vehicle is a scooter type vehicle in which the vehicle body frame 11 is entirely covered with a cowl 31.

A pivot shaft 33 connects the paired left and right rear sub-frames 24 together and disposed in the vehicle width direction. In addition, the front end of a swing arm 34 is rotatably pivotally supported by the pivot shaft 33. The swing arm 34 extends rearward while branching into two parts. A rear wheel 35 is rotatably pivotally supported by the rear ends of the swing arm 34. Accordingly, the swing arm 34 is swingably disposed on the rear of the main body frame 11, and the rear wheel 35 is pivotally supported by the rear ends of the swing arm 34.

Figure 2:
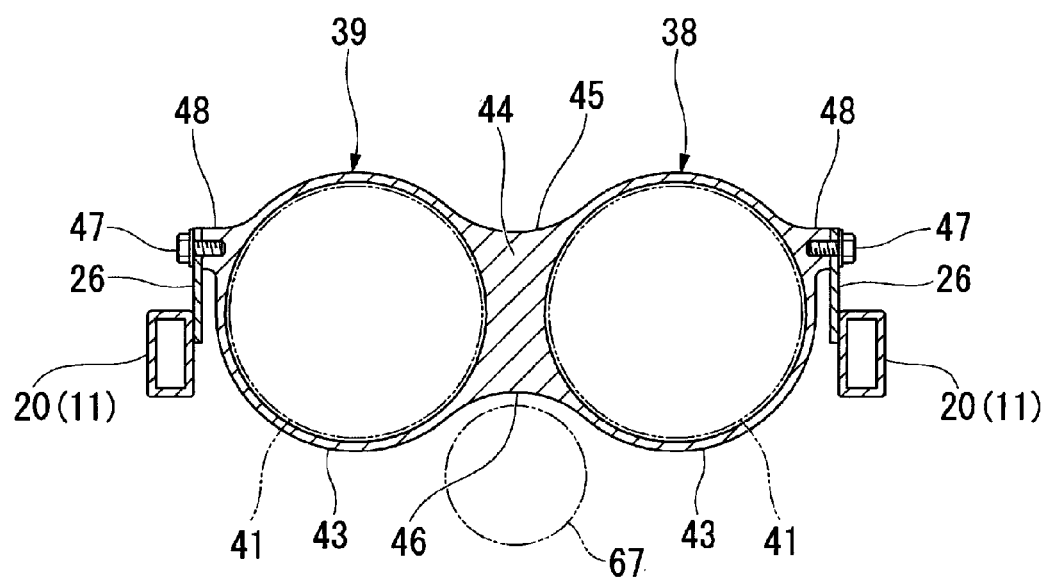
FIG. 2 is a cross-sectional view showing a vehicle body frame, a motor unit and a suspension of the electric vehicle, taken along the line 2-2 of FIG. 1.

A motor unit 38 is attached to the left and right support plates 26 provided to portions above the boundaries between the upper frames 20 and the rear sub-frames 24, respectively, in a way that makes the motor unit 38 connect the left and right support plates 26 together. Thus, the motor unit 38 is disposed between the upper frames 20 and the rear sub-frames 24. In the motor unit 38, paired left and right electric motors 41 for generating a travel driving force are disposed inside a unit case 39, which forms the exterior of the motor unit 38. In this respect, the paired left and right electric motors 41 are equally deviated from the center to the respective left and right sides in the vehicle width direction with their positions in the vertical direction and the front-rear direction mutually matched in the unit case 39, as shown in FIG. 2. These electrical motors are identical, and are each set in a longitudinal layout in which a rotating shaft 42 is disposed in the front-rear direction of the vehicle, as shown in FIG. 1. To put it more specifically, the rotating shafts 42 are disposed horizontally in the front-rear direction of the vehicle in the first embodiment.

As shown in FIG. 2, the unit case 39 of the motor unit 38 in which the left and right electric motors 41 are stored is made of an aluminum copper alloy, for example, and includes: paired left and right storage portions 43 each having a substantially cylindrical shape, and configured to store their respective electric motors 41; and a connection portion 44 connecting the storage portions 43 together, and located in the center in the vehicle width direction. The connection portion 44 includes: an upper recessed portion 45 recessed downward in an arc-like shape, and formed on the upper portion of the connection portion 44; and a lower recessed portion 46 recessed upward in an arc-like shape, and formed on the lower portion of the connection portion 44. In addition, attachment bosses 48 are formed respectively on the left and right outer upper portions of the unit case 39. The left and right attachment bosses 48 are fixed to the left and right support plates 26, respectively, by use of bolts 47. The left and right storage portions 43 for respectively storing the electric motors 41 are also disposed horizontally in the front-rear direction of the vehicle. The unit case 39 is shaped symmetrically with respect to the center in the vehicle width direction.

Note that, as shown in FIG. 1, the position of the lower end of the motor unit 38 including the electric motors 41 is located above the positions of the lower ends of the lower frames 21, respectively. Moreover, the positions of the electric motors 41 and the motor unit 38 including these motors in the front-rear direction overlap the positions of the lower frames 21 in the front-rear direction. In addition, the positions of the electric motors 41 and the motor unit 38 including these motors in the front-rear direction and the vertical direction overlap the positions of the upper frames 20 in the front-rear direction.

A PDU (power drive unit) 50, which is a motor driver, is provided above and close to the motor unit 38. The PDU 50 is provided while the position of the PDU 50 in the front-rear direction and the left and right direction overlaps the positions of the electric motors 41 and the motor unit 38, which includes these motors, in the front-rear direction and the left and right direction. In addition, the position of the PDU 50 in the front-rear direction overlaps the positions of the seat rails 23 in the front-rear direction, and is disposed under the seat rails 23. To put it more specifically, the PDU 50 is disposed within a range surrounded by the upper frame 20, the seat rail 23 and the rear sub-frame 24 when viewed in a side view.

The rotating shafts 42 of the left and right electric motors 41, which protrude rearward from the motor unit 38, are connected to the front ends of paired left and right drive shafts 52, respectively. The rotating shafts 42 of the left and right electric motors 41 are configured to transmit their respective driving forces to the left and right drive shafts 52. The left and right drive shafts 52 are identical, and include constant-velocity joints 53 at their respective front ends. The left and right drive shafts 52 are connected to the left and right rotating shafts 42, respectively, via the constant-velocity joints 53. The constant-velocity joints 53 swingably connect together the rotating shafts 42 and shaft main bodies 54 extending rearward from the constant-velocity joints 53 of the drive shafts 52 in a way that the constant-velocity joints 53 makes the rotating shafts 42 and the shaft main bodies 54 rotatable at a constant velocity. The paired left and right drive shafts 52 are disposed on the left and right of the rear wheel 35, respectively.

The rear ends of the paired left and right drive shafts 52 are connected to paired left and right bevel pinion gears 56, respectively, in a way that the left and right drive shafts 52 as well as the left and right bevel pinion gears 56 coaxially rotatable. The paired left and right bevel pinion gears 56 are in mesh with paired left right bevel wheel gears 57, respectively. The paired left and right bevel pinion gears 56 are identical, and the paired left and right bevel wheel gears 57 are also identical. The paired left right bevel wheel gears 57 are fixed to the left and right sides of the rear wheel 35, respectively.

The bevel pinion gears 56 and the bevel wheel gears 57 convert the axes of rotation of the drive shafts 52 by 90 degrees to the vehicle width direction.

Here, the paired left and right drive shafts 52 including the respective constant-velocity joints 53, the paired left and right bevel pinion gears 56 and the paired left and right bevel wheel gears 57 described above are stored in an arm case 59 forming the exterior of the swing arm 34. Then, when the paired left and right electric motors 41 rotate in directions reverse to each other, the paired left and right drive shafts 52, the paired left and right bevel pinion gears 56 and the paired left and right bevel wheel gears 57 transmit their respective driving forces to the rear wheel 35 in the same rotation direction.

A connection shaft 61 extending in the vehicle width direction is provided in the center of the front lower portion of the swing arm 34 in the vehicle width direction. One ends of paired left and right link plates 62 are rotatably pivotally supported by both ends of the connection shaft 61, respectively. The middle positions of the link plates 62 are rotatably pivotally supported by a support shaft 63 which connects together the paired left and right support plates 27 in the vehicle width direction. In addition, a connection shaft 64 is provided to the other ends of the respective link plates 62 in the vehicle width direction. A connection shaft 65 provided in the center of the lower cross pipe 25 in the vehicle width direction and extending in the vehicle width direction is disposed in the front of the connection shaft 64, the lower cross pipe 25 connecting together the left and right lower frames 25.

Further, the rear end of a suspension 67 is rotatably pivotally supported by the connection shaft 64 of the link plates 62, while the front end of the suspension 67 is rotatably pivotally supported by the connection shaft 65 of the lower cross pipe 25. With this configuration, the connection shaft 64 and the connection shaft 65 hold the only single suspension 67 in the center portion in the vehicle width direction while the suspension 67 is in the posture extending in the front-rear direction of the vehicle. To put it differently, the only single suspension 67 connects together the lower cross pipe 25 of the vehicle body frame 11 and the swing arm 34 by use of the connection shaft 61, the link plates 62, the connection shaft 64 and the connection shaft 65.

The suspension 67 is formed from a coil spring and a shock absorber, the illustrations of which are omitted herein. When the swing arm 34 swings upward about the pivot shaft 33, the link plates 62 connected to the swing arm 34 rotate in a counterclockwise direction in FIG. 1 about the support shaft 63, and thus extend the suspension 67 by moving the connection shaft 64 at the lower portions of the link plates 62 rearward. When the swing arm 34 swings downward about the pivot shaft 33, the link plates 62 connected to the swing arm 34 rotate in a clockwise direction in FIG. 1 about the support shaft 63, and thus compresses the suspension 67 by moving the connection shaft 64 at the lower portion of the link plates 62 forward.

In this respect, the suspension 67 is disposed under the electric motors 41 and the motor unit 38 including these motors with the position of the suspension 67 in the front-rear direction overlapping the positions of the electric motors 41 and the motor unit 38, which include these motors, in the front-rear direction. Furthermore, the suspension 67 is disposed on inner sides of the respective electric motors 41 in the vehicle width direction, as shown in FIG. 2. Moreover, as shown in FIG. 1, the suspension 67 is disposed under the drive shafts 52 and the swing arm 54 including the drive shafts 52 with the position of the suspension 67 in the front-rear direction overlapping the positions of the drive shafts 52 and the swing arm 54 in the front-rear direction, as well as on inner sides of the respective drive shafts 52 and the swing arm 54 in the vehicle width direction. Moreover, the suspension 67 is disposed between the sets of the electric motors 41 and the drive shafts 52, which are disposed in parallel in the left and right sides while their positions in the vertical direction are matched. In addition, as shown in FIG. 2, the suspension 67 is disposed in such a way that the upper portion of the suspension 67 enters the lower recessed portion 46 with the position of the upper portion of the suspension 67 in the vertical direction overlapping the positions of the electric motors 41 and the motor unit 38, which includes these motors, in the vertical direction. Moreover, the vehicle-width whole of the suspension 67 is disposed within a range of the motor unit 38 with the position of the suspension 67 in the vehicle width direction overlapping the positions of the respective left and right electric motors 41. In addition, the suspension 67 is disposed between the left and right lower frames 21 with the position of the suspension 67 in the front-rear direction and the vertical direction overlapping the positions of the lower frames 21 in the front-rear direction and the vertical direction, as shown in FIG. 1.

Figure 3:
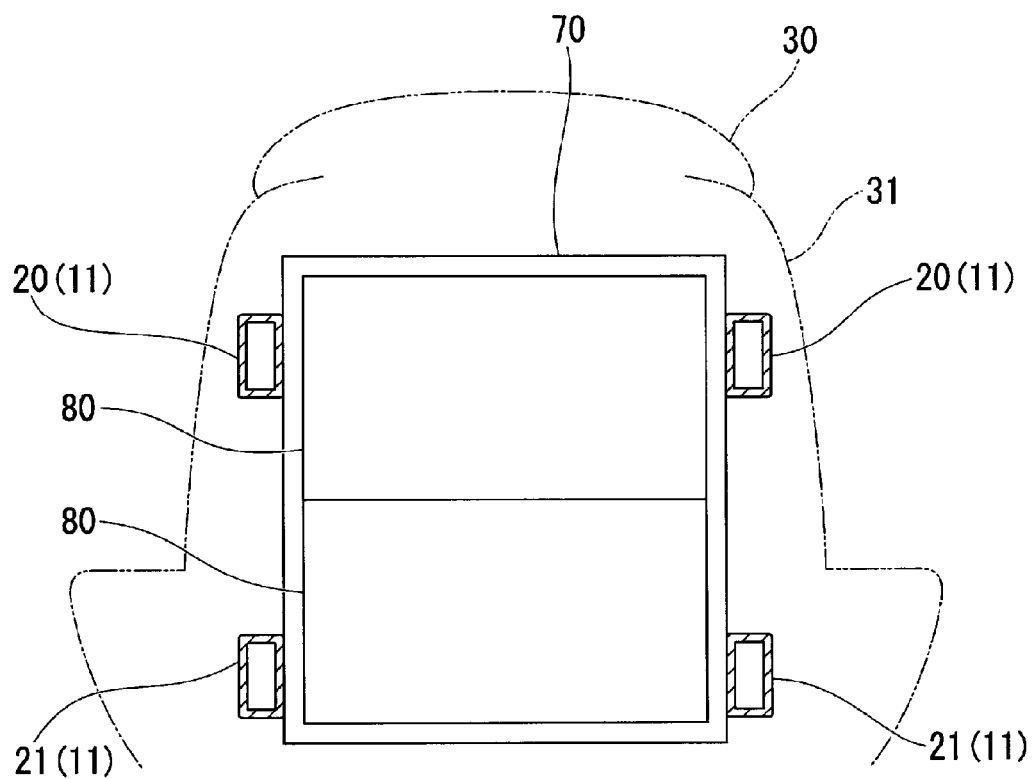
FIG. 3 is a cross-sectional view showing the vehicle body frame, a battery storage unit and batteries of the electric vehicle, taken along the line 3-3 of FIG. 1.

As shown in FIG. 3, a battery storage unit 70 is provided among the paired left and right upper frames 20 as well as the paired left and right lower frames 21 of the vehicle body frame 11. As shown in FIG. 1, the battery storage unit 70 is disposed in front of the motor unit 38 including the electric motors 41, the lower cross pipe 25 and the PDU 25. To put it differently, the motor unit 38 including the electric motors 41, the lower cross pipe 25 and the PDU 25 are disposed in the rear of the battery storage unit 70.

High-voltage batteries 80 for supplying power to the electric motors 41 are detachably disposed in the battery storage unit 70. The battery storage unit 70 allows the batteries 80 to be stored in multiple rows in the front-rear direction, and in multiple layers in the vertical direction. To put it more specifically, the batteries can be stored in five rows in the front-rear direction, and in two layers in the vertical direction, that is, a total of ten batteries 80 can be stored in the battery storage unit 70. The battery storage unit 70 can be opened upward, and the batteries 80 can be detached when a cover (the illustration of which is omitted) of the cowl 31 and the seat 30, which are provided thereabove, are opened. Note that, the number of batteries 80 to be stored in the battery storage unit 70 can be increased or decreased in accordance with a planned travel distance or the like, and the space in the battery storage unit 70 which becomes available by decreasing the number of batteries 80 to be installed can be used effectively as a storage space.

An inlet 83 which opens forward is provided to a front cowl 82 forming the front portion of the cowl 31, and an air intake duct 84 connected to the inlet 83 is provided to the inner side of the cowl 31 including the front cowl 82. This air intake duct 84 is connected to the upper front portion of the battery storage unit 70. Meanwhile, an exhaust port 85 is provided to the bottom portion of the rear end of the battery storage unit 70. Accordingly, the cooling air introduced into the air intake duct 84 through the inlet 83 flows inside the battery storage unit 70 from the upper front portion of the battery storage unit 70 toward the exhaust port 85 at the bottom portion of the rear end of the battery storage unit 70, and thus cools the batteries 80 in the battery storage unit 70. Note that, although traveling wind is introduced into the air intake duct 84, an electric fan 86 for taking the air through the inlet 83 while the vehicle is not in motion is disposed in the air intake duct 84. In addition, a DC-DC converter 88 having a relatively high heat generation amount is disposed in the air intake duct 84.

A charger plug 90 to or from which a power-supply cable of an AC 100-volt external power supply, for example, is attached or detached is provided to the front end surface of the font cowl 82. A charger 91 for charging the batteries 80 by use of the external power supply is provided between the power plug 90 and the head pipe 12 in the front cowl 82.

Paired left and right storage boxes 95 are disposed in space portions above the swing arm 34 and on the outer lateral sides of the respective left and right seat rails 23 in the vehicle width direction, respectively, the swing arm 34 including the left and right drive shafts 52 therein. These storage boxes 95 are attached respectively to the seat rails 23 by use of brackets, the illustrations of which are omitted herein. Note that, storage boxes smaller than the storage boxes 95 may be disposed in the areas between the swing arm 34, in which the left and right drive shafts 52 are included, and the left and right seat rails 23, respectively.

Figure 4:
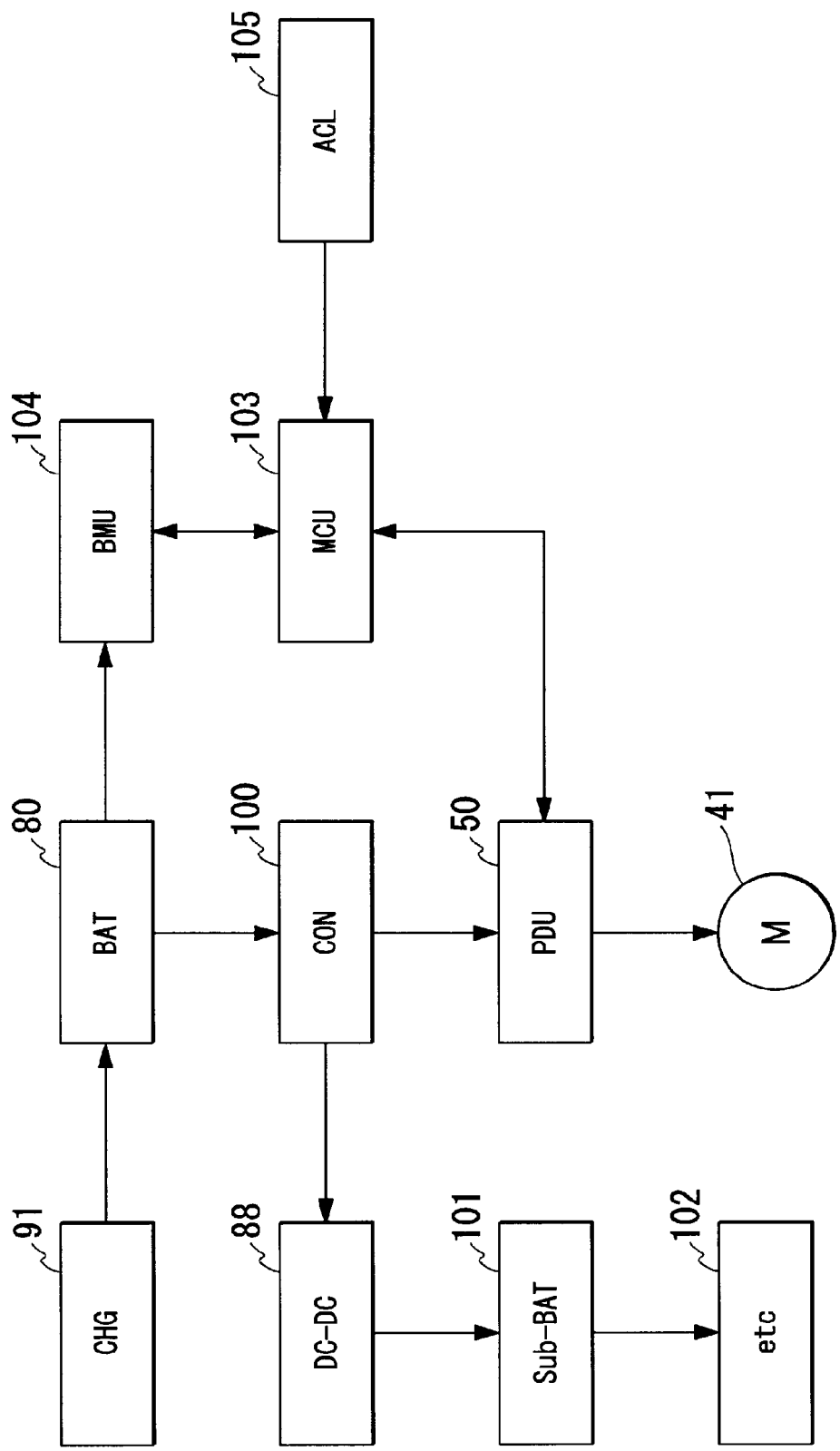
FIG. 4 is a block diagram of a control system of the electric vehicle.

In this respect, as shown in FIG. 4, the electric power from the batteries 80 is supplied to the PDU 50, which is a motor driver, via a contactor 100 linked to a main switch, the illustration of which is omitted herein. Then, after converted from a direct current to a three-phase alternating current by the PDU 50, the electric power is supplied to the electric motors 41 each of which is a three-phase AC motor. In addition, the voltage outputted from the batteries 80 is lowered by the DC-DC converter 88, and is supplied to a 12-volt low-voltage sub-battery 101, general electric components 102 such as a light and the electric fan 86, as well as a control system component such as an MCU (motor control unit) 103.

The batteries 80 are charged by the aforementioned charger 91 connected to the AC 100-volt power supply, for example. The charge and discharge conditions, temperature and the like of the batteries 80 are monitored by a BMU (battery managing unit) 104. The information on the charge and discharge conditions, temperature and the like of the batteries 80 are shared with the MCU 103. The MCU 103 receives output request information from a throttle (accelerator) 105, and controls the drives of the respective electric motors 41 via the PDU 50 on the basis of the output request information. Note that, a configuration without the sub-battery 101 may be employed depending on a type of the batteries 80.

The electric vehicle of the first embodiment described above makes it no longer necessary to dispose the suspension in the space above the swing arm 34, and accordingly makes it possible to use the space above the swing arm 34 effectively, because: the electric motors 41 are connected to the respective drive shafts 52 in a way that the electric motors 41 are set in the longitudinal layout in which the rotating shafts 42 are disposed in the front-rear direction of the vehicle, and concurrently in a way that the electric motors 41 are disposed, deviated from the center to the respective left and right sides in the vehicle width direction; and the suspension 67 is disposed under the electric motors 41 and the drive shafts 52 with the position of the suspension 67 in the front-rear direction overlapping the positions of the electric motors 41 and the drive shafts 52 in the front-rear direction, and on the inner sides of the electric motors 41 and the derive shafts 52 in the vehicle width direction, respectively. Moreover, the electric vehicle of the first embodiment makes it possible to dispose the electric motors 41, the drive shafts 52 and the suspension 67 compactly in a collective manner in the front-rear direction and the vehicle width direction.

In addition, it is no longer necessary to employ a mechanism for converting the direction of the axis of rotation to the front-rear direction of the vehicle, and it is thus made possible to achieve further reduction in size, because the electric motors 41 are set in the longitudinal layout in which the rotating shafts 42 are disposed in the front-rear direction of the vehicle. Additionally, the suspension 67 can protect the electric motors 41 and the drive shafts 52 from flying stones and something similar, because the suspension 67 is disposed under the electric motors 41 and the drive shafts 52.

It is possible to achieve equalization of the weight balance by distributing the electric motors 41, which are heavy articles, between the left and right sides, as well as by disposing the suspension 67 in between, because: the sets of the electric motors 41 and the drive shafts 52 are disposed, respectively, on the left and right sides in the vehicle width direction in parallel; and the suspension 67 is disposed between the sets. Moreover, it is possible to reduce the arrangement space in size, and thus to secure a wider space around the arrangement space, because the distribution of the electric motors 41 and the drive shafts 52 between the multiple sets enables reduction in the size of the electric motor 41 and the drive shaft 52 which are included in each set.

It is possible to secure volumes for the storage boxes 95, because: the storage boxes 95 are attached to the seat rails 23 by disposing the storage boxes 95 in the space portions on the lateral sides of the seat rails 23 above the swing arm 34 including the drive shafts 52, respectively; and thereby, the spaces above the swing arm 34 are secured. Note that, as described above, even if the storage boxes 95 are respectively disposed in the space portions between the swing arm 34, which includes the drive shafts 52, and the seat rails 23, the volumes can be similarly secured for the storage boxes 95. In addition, in a case where the drive shafts 52 are provided outside the swing arm 34, the volumes can be similarly secured for the storage boxes, respectively, by disposing the storage boxes in space portions on the lateral sides of the seat rails above the swing arm or the drive shafts, or in space portions between the swing arm or the drive shafts and the seat rails.

It is possible to achieve reduction in the size of the vehicle body because the battery storage unit 70 is disposed by effectively using the space (straddle portion of the rider) among the upper frames 20 and the lower frames 21. In addition, it is possible to secure the height for the battery storage unit 70 by disposing the electric motors 71 in the rear of the battery storage unit 70. As a result, the volume can be secured for the battery storage unit 70. Accordingly, a larger number of batteries 80 can be installed in the battery storage unit 70, and the storage space made when the number of batteries 80 is reduced becomes larger as well.

It is possible to reduce the weight of the swing arm 34 including the drive shafts 52, which is the swingable article, because: the electric motors 41 are attached to the vehicle body frame 11; and the drive shafts 52 are connected to the electric motors 41 by use of the constant-velocity joints 51, respectively.

It is possible to effectively use the space in front of the electric motors 41, because the drives shafts 52 are those configured to transmit the driving forces of the electric motors 41 to the rear wheel 35, respectively. Accordingly, the volume can be secured for the battery storage unit 70.

It is possible for the lower frames 21 to prevent the bottoms of the electric motors 41 from hitting the road, because the positions of the lower ends of the electric motors 41 are located above the positions of the lower ends of the lower frames 21.

It is possible to easily bring the charger plug 90 closer to a power supply while the vehicle stops, because the charger plug 90 is provided in the front end surface of the front cowl 82. Thus, the charging operation is made easy.

It is possible to cool the batteries 80 well, because the outside air for cooling is introduced into the battery storage unit 70 through the air intake duct 84.

It is possible to cool the DC-DC converter 88 well, because the DC-DC converter 88 is disposed in the air intake duct 84.

Figure 5:
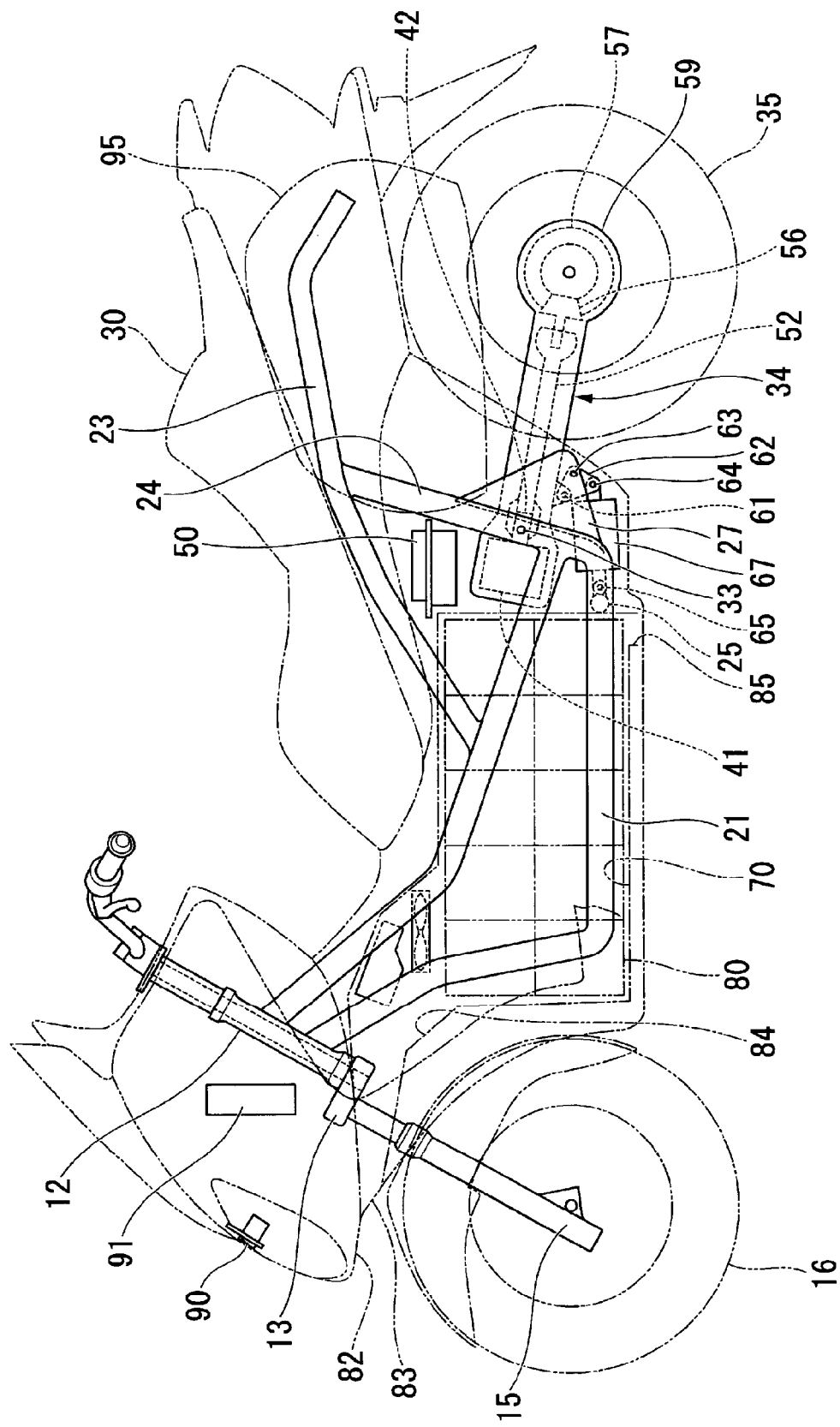
FIG. 5 is a side view showing a second embodiment of an electric vehicle.

Next, a description will be given of a second embodiment of an electric vehicle, mainly on the basis of FIG. 5, with a focus on differences from the first embodiment.

In the electric vehicle of the second embodiment, the left and right electric motors 41 are stored in the arm case 59 of the swing arm 34. To put it more specifically, the left and right electric motors 41 also swing integrally with the swing arm 34. Thus, the drive shafts 52 are coaxially disposed and connected to the rotating shafts 42 of the electric motors 41 without the constant-velocity joints 53 of the first embodiment. As a result, although the electric motors 41 are set in the longitudinal layout in which the rotating shafts 42 are disposed in the front-rear direction of the vehicle, the electric motors 41 incline slightly rearward downward as in the case of the swing arm 34, but are not positioned horizontally. In addition, neither the unit case 39 nor the support plates 26 of the first embodiment are provided to the electric vehicle of the second embodiment.

The electric vehicle of the second embodiment as described above makes it possible to build the electric motors 41 and the swing arm 34 in a single unit, and thereby to improve the assembly workability, because the electric motors 41 swing integrally with the swing arm 34.

Note that, although the first and second embodiments have been described citing the case where the two electric motors 41 are provided, the invention can be applied to a case where only one electric motor 41 is provided.

In addition, although the first and second embodiments have been described citing the electric motorcycle, the invention can be applied to things such as an electric four-wheeled vehicle of a saddle riding type in which two rear wheels are supported by a swing arm.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An electric vehicle, comprising:
a vehicle body frame;
an electric motor for generating a travel driving force;
a swing arm swingably provided in the rear of the vehicle body frame, and pivotally supporting a rear wheel at a rear end of the swing arm;
a drive shaft for transmitting the driving force of the electric motor to the wheel; and
a suspension connecting the vehicle body frame and the swing arm together,
wherein the electric motor is connected to the drive shaft in a way that: the electric motor is set in a longitudinal layout in which a rotating shaft is disposed in a front-rear direction of the vehicle; and the electric motor is disposed, deviated from a center to any one of left and right sides in a vehicle width direction, and
wherein the suspension is disposed under the electric motor and the drive shaft, and on the inner sides of the electric motor and the drive shaft in the vehicle width direction, with the position of the suspension in the front-rear direction overlapping the positions of the electric motor and the drive shaft in the front-rear direction.

2. The electric vehicle of claim 1,
wherein a set of the electric motor and the drive shaft is disposed in each of the left and right sides in the vehicle width direction in parallel, and
wherein the suspension is disposed between the sets.

3. The electric vehicle of claim 1,
wherein the vehicle body frame includes: a head pipe pivotally supporting a steering shaft; a main frame extending rearward from the head pipe; a seat rail extending rearward from the main frame; and a rear sub-frame connecting the main frame and the seat rail together, and
a storage box is attached to the seat rail by disposing the storage box in a space portion on a lateral side of the seat rail above the swing arm or the drive shaft, or in a space portion between the swing arm or the drive shaft and the seat rail.

4. The electric vehicle of claim 2,
wherein the vehicle body frame includes: a head pipe pivotally supporting a steering shaft; a main frame extending rearward from the head pipe; a seat rail extending rearward from the main frame; and a rear sub-frame connecting the main frame and the seat rail together, and
a storage box is attached to the seat rail by disposing the storage box in a space portion on a lateral side of the seat rail above the swing arm or the drive shaft, or in a space portion between the swing arm or the drive shaft and the seat rail.

5. The electric vehicle claim 1,
wherein the vehicle body frame includes: a head pipe pivotally supporting a steering shaft; upper frames extending rearward from the head pipe on an upper side; and lower frames extending rearward from the head pipe on a lower side,
a battery for supplying power to the electric motor is detachably disposed in a battery storage unit between the upper frames and the lower frames, and
wherein the electric motor is disposed in the rear of the battery storage unit.

6. The electric vehicle claim 2,
wherein the vehicle body frame includes: a head pipe pivotally supporting a steering shaft; upper frames extending rearward from the head pipe on an upper side; and lower frames extending rearward from the head pipe on a lower side,
a battery for supplying power to the electric motor is detachably disposed in a battery storage unit between the upper frames and the lower frames, and
wherein the electric motor is disposed in the rear of the battery storage unit.

7. The electric vehicle of claim 1,
wherein the electric motor is attached to the vehicle body frame, and
wherein the drive shaft is connected to the electric motor by use of a constant-velocity joint.

8. The electric vehicle of claim 2,
wherein the electric motor is attached to the vehicle body frame, and
wherein the drive shaft is connected to the electric motor by use of a constant-velocity joint.

9. The electric vehicle of claim 1, wherein the electric motor swings integrally with the swing arm.

10. The electric vehicle of claim 2, wherein the electric motor swings integrally with the swing arm.

11. The electric vehicle of claim 3, wherein the electric motor swings integrally with the swing arm.

12. The electric vehicle of claim 5, wherein the electric motor swings integrally with the swing arm.

13. The electric vehicle of claim 1, wherein the drive shaft transmits the driving force of the electric motor to the rear wheel.

14. The electric vehicle of claim 2, wherein the drive shaft transmits the driving force of the electric motor to the rear wheel.

15. The electric vehicle of claim 1,
wherein the vehicle body frame includes: a head pipe pivotally supporting a steering shaft; upper frames extending rearward from the head pipe on an upper side; and lower frames extending rearward from the head pipe on a lower side, and
wherein a position of a lower end of the electric motor is located above positions of lower ends of the lower frames.

16. The electric vehicle of claim 2,
wherein the vehicle body frame includes: a head pipe pivotally supporting a steering shaft; upper frames extending rearward from the head pipe on an upper side; and lower frames extending rearward from the head pipe on a lower side, and
wherein a position of a lower end of the electric motor is located above positions of lower ends of the lower frames.

17. The electric vehicle of claim 3,
wherein the vehicle body frame includes: a head pipe pivotally supporting a steering shaft; upper frames extending rearward from the head pipe on an upper side; and lower frames extending rearward from the head pipe on a lower side, and
wherein a position of a lower end of the electric motor is located above positions of lower ends of the lower frames.

18. The electric vehicle of claim 5,
wherein the vehicle body frame includes: a head pipe pivotally supporting a steering shaft; upper frames extending rearward from the head pipe on an upper side; and lower frames extending rearward from the head pipe on a lower side, and
wherein a position of a lower end of the electric motor is located above positions of lower ends of the lower frames.

19. The electric vehicle of claim 7,
wherein the vehicle body frame includes: a head pipe pivotally supporting a steering shaft; upper frames extending rearward from the head pipe on an upper side; and lower frames extending rearward from the head pipe on a lower side, and
wherein a position of a lower end of the electric motor is located above positions of lower ends of the lower frames.

20. The electric vehicle of claim 9,
wherein the vehicle body frame includes: a head pipe pivotally supporting a steering shaft; upper frames extending rearward from the head pipe on an upper side; and lower frames extending rearward from the head pipe on a lower side, and
wherein a position of a lower end of the electric motor is located above positions of lower ends of the lower frames.

* * * * *